(12) United States Patent
Sakamoto et al.

(10) Patent No.: US 7,907,975 B2
(45) Date of Patent: Mar. 15, 2011

(54) BLUETOOTH COMMUNICATION SYSTEM FOR DRIVERS OF VEHICLES

(75) Inventors: Tsuneaki Sakamoto, Asaka (JP); Mayumi Sakamoto, legal representative, Asaka (JP); Masashi Hino, Niiza (JP); Yasuo Ohishi, Niiza (JP); Mitsuhiko Yamamoto, Kawasaki (JP); Masao Kikuchi, Kawasaki (JP); Shinako Watabe, Kawasaki (JP)

(73) Assignees: Honda Access Corporation, Saitama (JP); Fujitsu Limited, Kanagawa (JP)

( * ) Notice: Subject to any disclaimer, the term of this patent is extended or adjusted under 35 U.S.C. 154(b) by 1866 days.

(21) Appl. No.: 10/489,421

(22) PCT Filed: Sep. 12, 2002

(86) PCT No.: PCT/JP02/09337
§ 371 (c)(1),
(2), (4) Date: Nov. 19, 2004

(87) PCT Pub. No.: WO03/026257
PCT Pub. Date: Mar. 27, 2003

(65) Prior Publication Data
US 2008/0220718 A1  Sep. 11, 2008

(30) Foreign Application Priority Data
Sep. 14, 2001  (JP) .................... 2001-280279

(51) Int. Cl.
H04M 1/00 (2006.01)
(52) U.S. Cl. .......... 455/569.2; 455/567; 455/569.1; 455/344; 455/41.2

(58) Field of Classification Search ............. 455/41.2, 455/569.2, 567, 228
See application file for complete search history.

(56) References Cited

U.S. PATENT DOCUMENTS

| | | | | |
|---|---|---|---|---|
| 5,404,391 A * | 4/1995 | Wavroch et al. | ............. | 455/567 |
| 5,625,608 A * | 4/1997 | Grewe et al. | ............. | 369/24.01 |
| 5,729,589 A * | 3/1998 | Samson | ............. | 379/32.04 |
| 5,796,819 A * | 8/1998 | Romesburg | ............. | 379/406.09 |
| 5,867,794 A | 2/1999 | Hayes et al. | ............. | 455/557 |
| 6,006,114 A * | 12/1999 | Seppanen et al. | ............. | 455/557 |
| 6,081,692 A * | 6/2000 | Hayato | ............. | 340/7.51 |
| 6,134,456 A * | 10/2000 | Chen | ............. | 455/569.2 |
| 6,366,840 B1 * | 4/2002 | Buckley | ............. | 701/36 |

(Continued)

FOREIGN PATENT DOCUMENTS
WO   WO 01/67723 A1 *   9/2001

*Primary Examiner* — Zhiyu Lu
(74) *Attorney, Agent, or Firm* — Squire, Sanders & Dempsey, LLP

(57) ABSTRACT

A system is provided that enables communications between a driver of a vehicle and a person outside the vehicle, between a rider of a motorcycle and a fellow rider of the same vehicle, or between a driver of a vehicle and another driver of another vehicle. A Bluetooth communication system comprises a Bluetooth communication device mountable to a helmet, and an indicator unit having an indicator disposed in a viewing range of a driver of such a vehicle as a car or a boat. It further comprises a transmitting module disposed in the Bluetooth communication device for transmitting an indication signal to the indicator in response to reception of a calling signal and a receiving module disposed in the indicator unit for driving the indicator in response to reception of the indication signal. The indicator indicates when a call arrives at a Bluetooth communication device mounted on a helmet.

10 Claims, 14 Drawing Sheets

U.S. PATENT DOCUMENTS

| | | | |
|---|---|---|---|
| 6,373,401 B2 * | 4/2002 | Ho | 340/932.2 |
| 6,377,825 B1 * | 4/2002 | Kennedy et al. | 455/569.2 |
| 6,396,394 B1 * | 5/2002 | Suzuki et al. | 340/425.5 |
| 6,397,086 B1 * | 5/2002 | Chen | 455/569.2 |
| 6,487,422 B1 * | 11/2002 | Lee | 455/550.1 |
| 6,622,124 B1 * | 9/2003 | Kolls | 705/14 |
| 7,133,663 B2 * | 11/2006 | Fano et al. | 455/414.1 |
| 7,254,123 B2 * | 8/2007 | Jukarainen | 370/337 |
| 7,292,880 B2 * | 11/2007 | Lehtonen | 455/569.1 |
| 2001/0019308 A1 * | 9/2001 | Ho | 340/932.2 |
| 2002/0032048 A1 * | 3/2002 | Kitao et al. | 455/569 |
| 2003/0009281 A1 * | 1/2003 | Whitham | 701/211 |
| 2003/0032460 A1 * | 2/2003 | Cannon et al. | 455/569 |
| 2003/0036360 A1 * | 2/2003 | Russell et al. | 455/66 |
| 2006/0019713 A1 * | 1/2006 | Rokusek et al. | 455/563 |
| 2006/0111910 A1 * | 5/2006 | Nelson | 704/270 |
| 2006/0269021 A1 * | 11/2006 | Ibrahim et al. | 375/346 |
| 2007/0141979 A1 * | 6/2007 | Brey | 455/3.06 |
| 2007/0203641 A1 * | 8/2007 | Diaz et al. | 701/208 |
| 2008/0160928 A1 * | 7/2008 | Tsfaty et al. | 455/77 |
| 2008/0165984 A1 * | 7/2008 | Yun et al. | 381/86 |
| 2008/0171536 A1 * | 7/2008 | Katz | 455/412.2 |

* cited by examiner

BLUETOOTH COMMUNICATION SYSTEM FOR DRIVERS OF VEHICLES

TECHNICAL FIELD

The present invention relates to a communication system used for such a vehicle as a car and a boat, and in particular it relates to a communication system in which a driver of such a vehicle can make a hands-free communication via a mobile phone or a transceiver using Bluetooth technology.

BACKGROUND OF THE INVENTION

Although mobile phones are commonly used, a driver of such a vehicle as a car and a boat cannot operate the mobile phone during traveling because the driver must handle the vehicle. Therefore, it is difficult, for example, to communicate with a driver of a moving vehicle from a remote site. And a motorcycle rider enjoying a tour cannot make a voice conversation with another motorcycle rider while they are traveling.

Besides, during a tandem ride with a motorcycle, it is difficult for a rider to make a comfortable conversation with a fellow rider due to such noises as engine sound and wind noise.

The Bluetooth technology is becoming popular with such devices as mobile phones, personal computers and household electric appliances. It uses a short-range communication protocol that employs a packet-communication protocol of a spread spectrum type.

The Bluetooth protocol is described, for example, by A. Sugiura in "A Guide for the Bluetooth Technology" Software Research Center, Mar. 10, 2001 and by K. Miyazu in "A Guide for the Bluetooth Technology" Ric-Telecom, Jun. 11, 2001.

It is an object of the present invention to provide a system for enabling a communication between a vehicle driver and a person outside the vehicle, between a rider of a motorcycle and its fellow rider during tandem ride, or between a vehicle driver and another vehicle driver.

SUMMARY OF THE INVENTION

A Bluetooth communication system comprises a Bluetooth communication device which can be mounted in a helmet, and an indicator unit having an indicator which is disposed in a viewing range of a driver of such a vehicle as a car and a boat. The system further comprises a transmitting module which is disposed in the Bluetooth communication device for transmitting an indication signal to the indicator in response to reception of a calling signal and a receiving module which is disposed in the indicator unit for driving the indicator in response to reception of the indication signal.

According to an aspect of the invention, the indicator indicates when a call arrives at a Bluetooth communication device mounted on a helmet, so that a vehicle driver can recognize the call by his or her own eyes and can selectively operate the communication system to respond to the call or ignore the call. In such way; the driver can either respond to or refuse the phone communication depending on the operating conditions of the vehicle.

According to one aspect of the invention, the Bluetooth communication device further comprises a Bluetooth module having a function of communicating with a mobile phone that is in conformance with the Bluetooth. Thus, vehicle drivers can communicate with many persons located in wider areas beyond the network communication frame of the Piconet or Scatternet under the Bluetooth standard.

According to another aspect of the invention, the Bluetooth communication system further comprises an FM transmitting module for transmitting signals to the indicator unit, and the indicator unit further comprises an FM receiving module for receiving the signals. According to this aspect of the invention, movement of a vehicle driver is not restricted even if the driver is equipped with a communication system according to the invention because the Bluetooth communication device and the indicator are interconnected through a wireless link.

According to a further aspect of the invention, the Bluetooth communication device is connected to a microphone and a speaker and further comprises a voice recognition unit for performing voice recognition upon voice input to the microphone and a control unit for transforming the recognized voice into control signals. Accordingly, a vehicle driver can operate a Bluetooth communication device by voice. A bone conductive microphone or a noise cancellation microphone may be used as the microphone for this aspect of the invention.

According to yet another aspect of the invention, the Bluetooth communication device further comprises a noise level detection circuit and a circuit for adjusting an audio volume based on the noise level detected by the noise level detection circuit. Accordingly, it is possible to make a communication even in a noisy condition caused by such noises as engine sound and wind noise.

According to yet another aspect of the invention, the Bluetooth communication device further comprises a voice synthesis unit for transforming the signal from the Bluetooth module into voice. Accordingly, the Bluetooth communication device can transform the control information from the device into voice so as to deliver the control information to the driver by voice.

According to yet another aspect of the invention, the Bluetooth communication device further comprises a manual switch for enabling a communication when the manual switch is operated. A compact size is required for the Bluetooth communication device mountable in the helmet, and accordingly the capacity of the battery as a power source is also restricted. The battery life can be prolonged by turning a talking function on and off by the manipulation of switch according to this aspect of the invention. According to a variation of the invention, the Bluetooth communication device further comprises a manual switch for activating voice recognition unit when it is operated.

According to yet another aspect of the invention, the control unit is configured so as to send a first-aid call transmission command to the mobile phone in response to a predetermined voice input from the driver. Accordingly, a vehicle driver can launch a first-aid call by voice.

According to yet another aspect of the invention, the Bluetooth communication device further comprises a Bluetooth module which can configure a network with another Bluetooth device in accordance with the Bluetooth standard. Accordingly, hands-free communications can be made between vehicle drivers.

DESCRIPTION OF THE PREFERRED EMBODIMENTS

Figure 1:
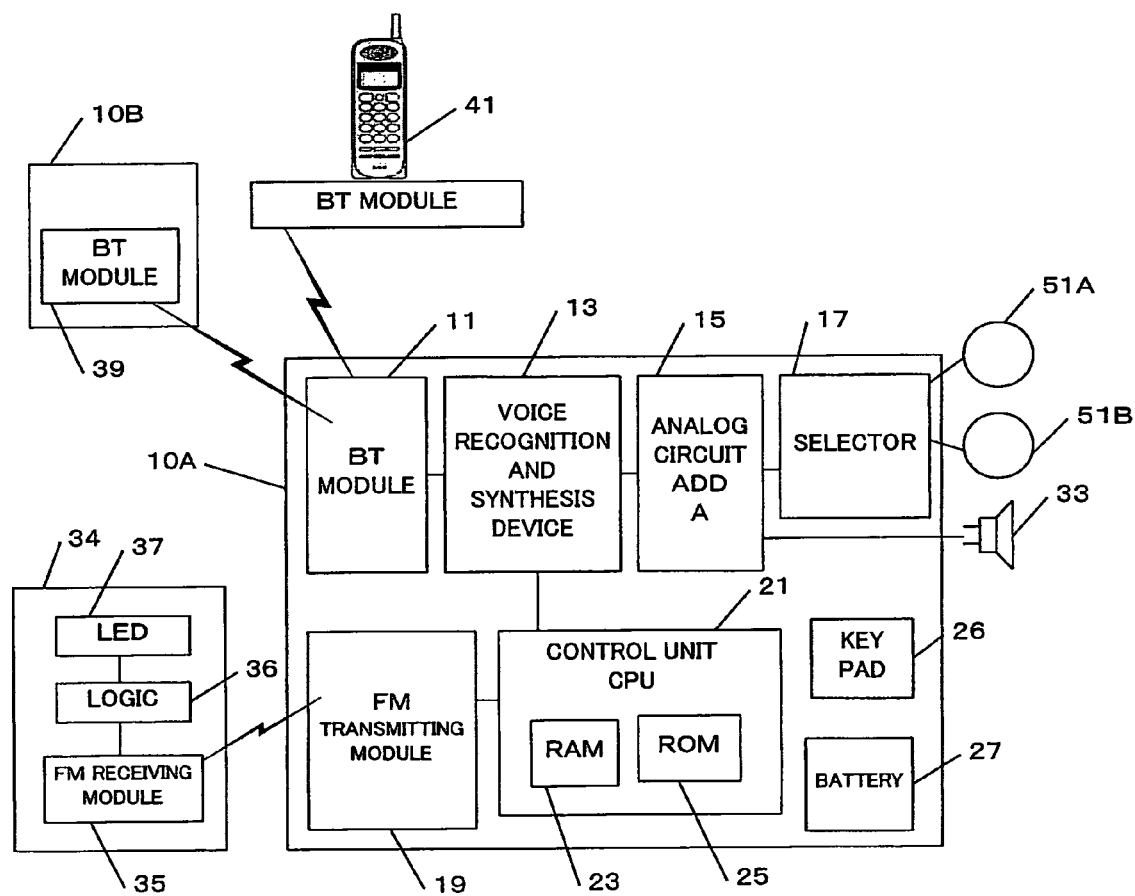
FIG. 1 is a block diagram showing an overall structure of a Bluetooth communication system according to one embodiment of the present invention.

Referring now to the attached drawings, a preferred embodiment of the present invention will be described. FIG. 1 is a block diagram showing an overall structure of a Bluetooth communication system according to one embodiment of the present invention. A Bluetooth communication device 10A comprises a headset in combination with microphones 51A and 51B and a speaker 33.

Figure 2:
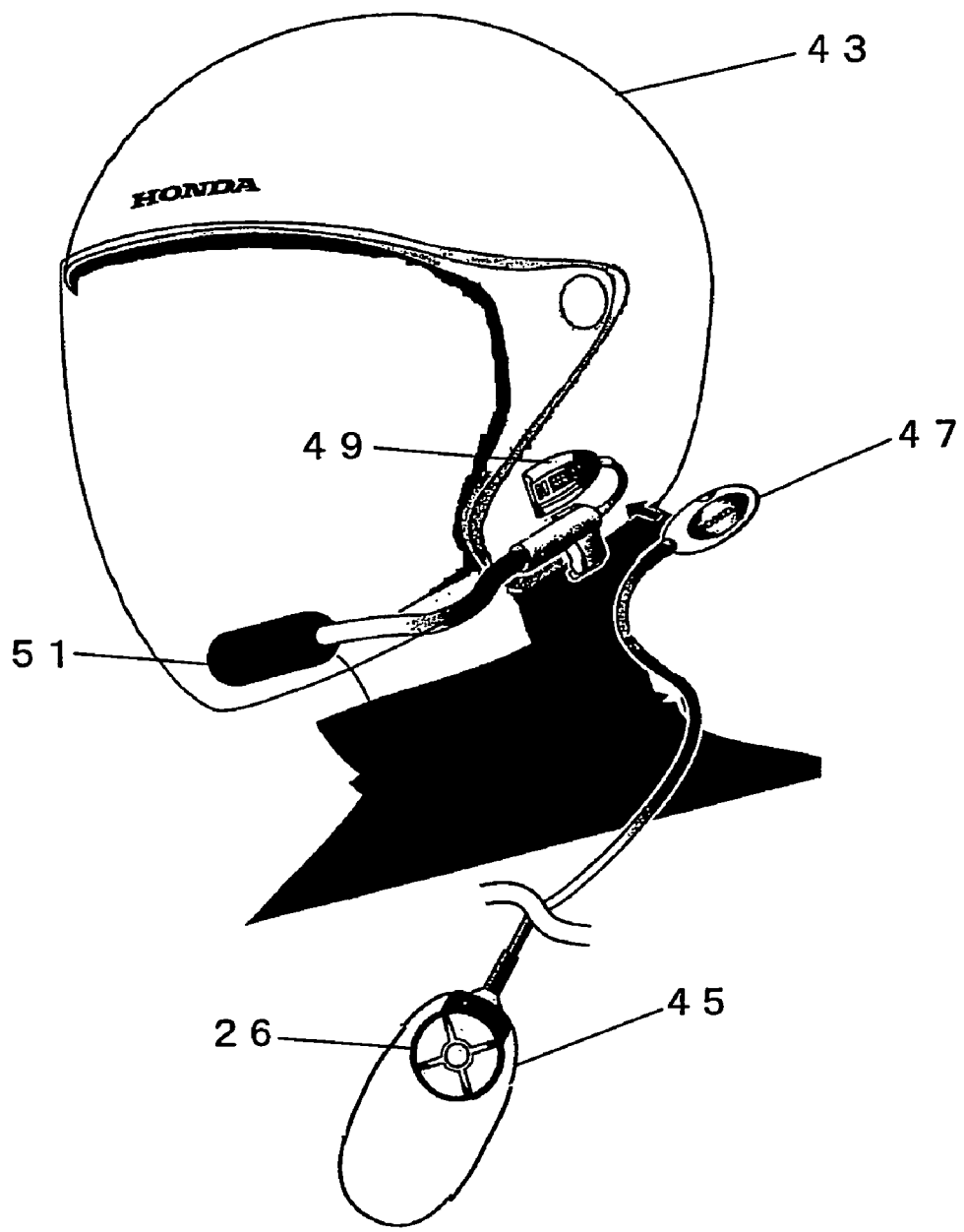
FIG. 2 illustrates an attachment of a headset with a helmet according to one embodiment of the present invention.

FIG. 2 illustrates a combination of the headset with a helmet for a rider of a motorcycle, which is an example of the vehicles. Although the following description refers to a motorcycle as an example of the vehicles and a rider of the motorcycle as an example of the vehicle drivers, the present invention is not limited to the motorcycle and is applicable broadly to any vehicle.

The Bluetooth communication device 10A is built into a hand unit 45, which is so small as it can be held in the driver's palm. The hand unit 45 is electrically and mechanically connected to a helmet 43 when a connector 47 is inserted into a connecting portion 49 of the helmet. A switch or a keypad 26 is provided in the hand unit 45 for manual operations. Within the helmet 43, a microphone 51 is disposed near the rider's mouth and a miniature speaker 33 (FIG. 1) is disposed near the rider's ear.

Referring to FIG. 1, the Bluetooth communication device (which will be hereinafter referred to as "BT communication device") 10A comprises a Bluetooth module (which will be hereinafter referred to as "BT module") 11, which is based on the Bluetooth standard, and the DSP voice recognition and synthesis device 13. DSP represents a digital signal processor for processing digital signals from the BT module 11. Voice recognition and synthesis device utilizes an integrated circuit that is commonly available in such fields as personal computers and mobile phones. An analog circuit 15 drives the speaker 33 in accordance with voice signals from the DSP voice recognition and synthesis device 13 and also processes voice signals input from a bone conductive microphone 51A or a noise cancellation microphone 51B.

The bone conductive microphone 51A is a special microphone which may vibrate in synchronization with voice of the bone of the human body when a person generates a voice but can pick up such vibration so as to transform the vibration into the sound source data. The noise cancellation microphone 51B is a special microphone which has a mechanism for decreasing such a noise as wind noise. A selector 17 is a circuit for selecting either the bone conductive microphone 51A or the noise cancellation microphone 51B to be used. It is not necessarily required for the headset to be equipped with both of these two kinds of microphones. A selector 17 is not required when only one microphone is used.

The operation of the BT communication device 10A is controlled by a control unit 21. The control unit 21 has a ROM 25 for containing a CPU and a computer program as well as a RAM 23 for providing a work space for the CPU.

An FM transmitting module 19 wirelessly transmits signals to an indicator unit 34 in accordance with commands from the control unit 21. The indicator unit 34 is disposed within a rider's view, for example, within a meter panel or a console part of a motorcycle, so that an FM receiving module 35 can receive a signal from the BT communication device 10A to indicate the reception of the signal on an indicator 37 through a logic unit 36. According to one embodiment, the indicator 37 comprises a light-emitting diode (LED) which may be turned on for informing the rider of the arrival of the communication signal. The light-emitting diode may be turned on with an appropriate emitting pattern corresponding to the signal sent by the BT communication device 10A. The rider can understand the meaning of the signal through such emitting pattern. Alternatively, the indicator 37 may be a liquid crystal panel.

The BT module 11 contained in the BT communication device 10A has several profiles of the standard Bluetooth. These profiles include a cordless telephone profile, an inter-com profile, a headset profile and a dial-up connection profile. The BT module 11 communicates with a mobile phone 41 that has its own built-in BT module, so that the BT communication device 10A connected to the helmet can function as a headset of the mobile phone 41.

The BT module 11 may use the inter-com profile to establish a master/slave relation with a BT communication device 10B of another rider so as to make a communication.

Figure 3:
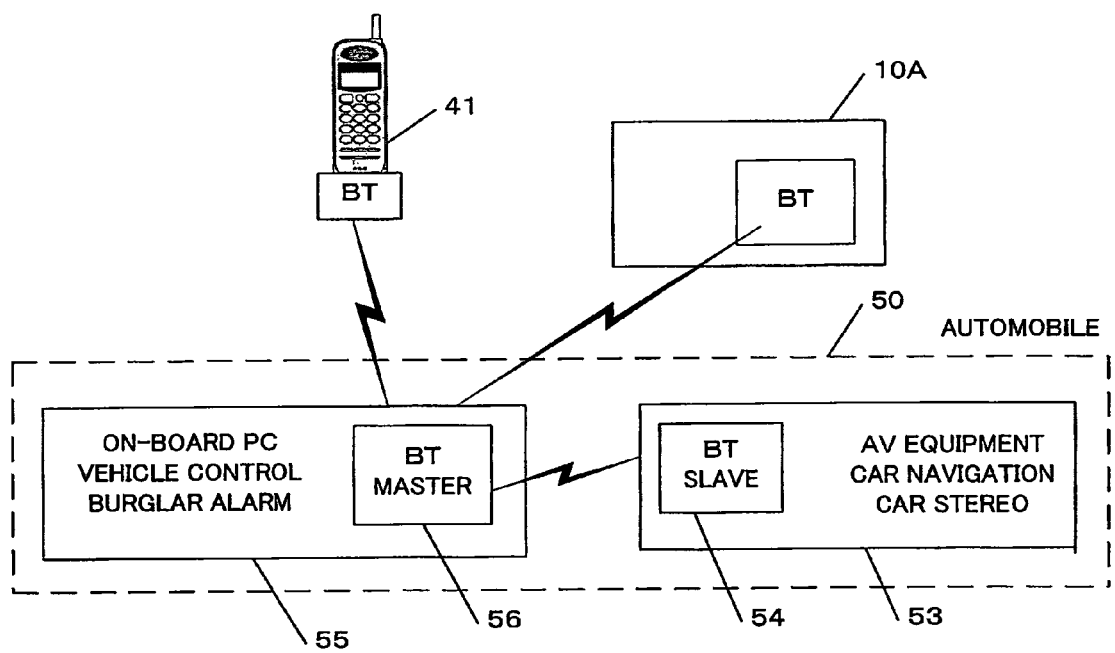
FIG. 3 is a block diagram showing an overall structure of another Bluetooth communication system according to another embodiment of the present invention.

FIG. 3 is a block diagram showing one variation of the embodiment according to the present invention. A PC 55 mounted in an automobile 50 is provided with a Bluetooth communication device 56. In the example shown in FIG. 3, the BT communication device 56 plays a role as a master and a BT communication device 54 disposed in such device as an AV equipment, a car navigation or a car stereo equipment mounted in the same car also plays a role as a slave, so that control signals can be communicated between the master and the slave. The BT communication device 56 mounted in the automobile not only can communicate with the BT communication device of the motorcycle but also can communicate with a mobile phone 41 carried by another driver as long as the mobile phone 41 conforms with the Bluetooth.

Figure 4:
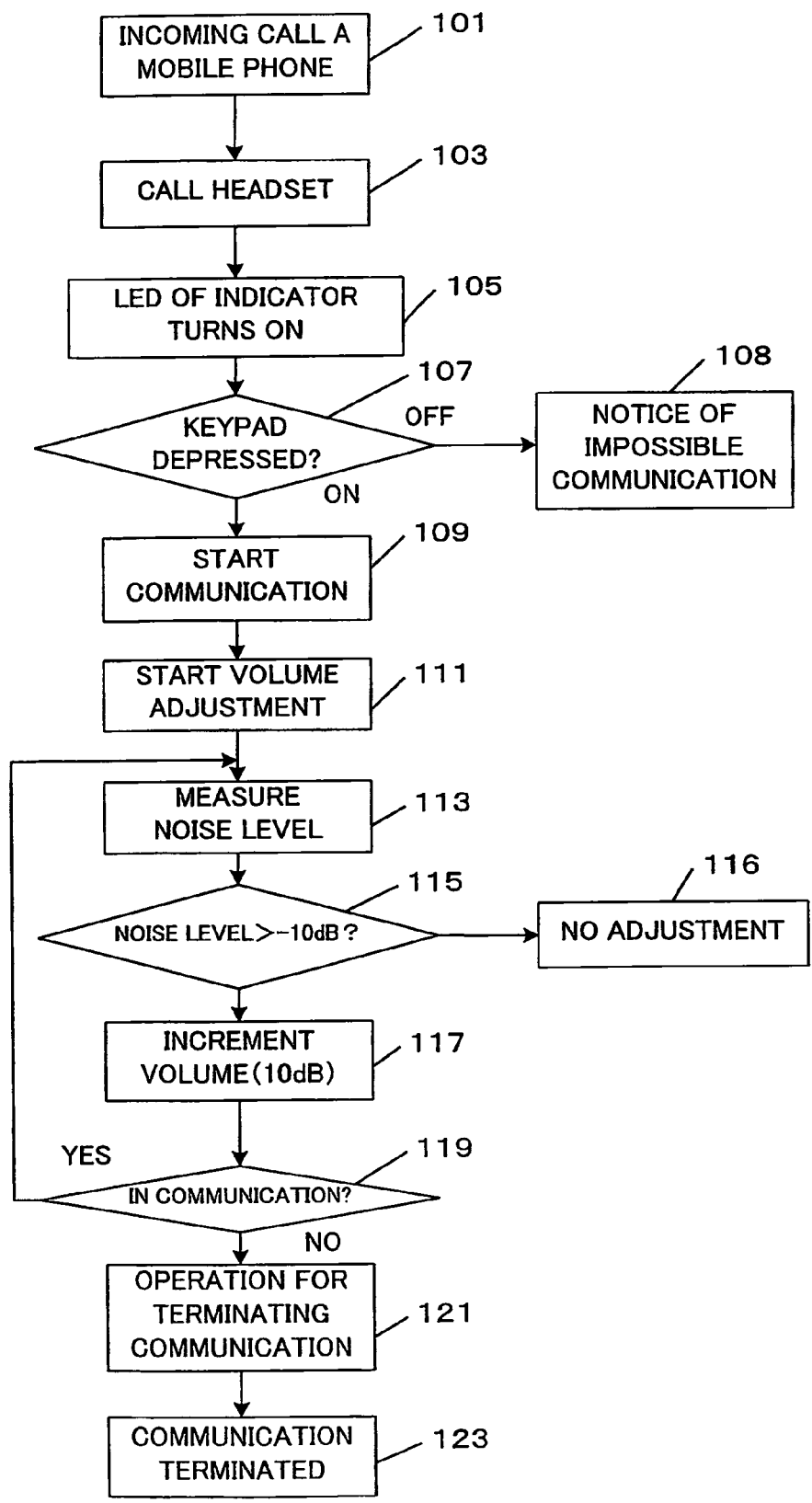
FIG. 4 is a flowchart showing a process according to one embodiment of the present invention.

FIG. 4 is a flowchart showing a process of the BT communication device 10A used for a motorcycle shown in FIG. 1. When an incoming call is received at the mobile phone 41 carried by a rider during traveling (step 101), the BT module of the mobile phone 41 transmits a calling signal to the BT communication device 10A of the headset (step 103). The BT module 11 of the BT communication device 10A receives this calling signal and the DSP 13 performs a signal processing to detect that the received signal is a calling signal. In response, the CPU 21 activates the FM transmitting module 19 to wirelessly transmit an indicator light signal. This indicator light signal is received by the FM receiving module 35 of the indicator unit 34 which is disposed in the meter panel of the motorcycle. Then, the LED of the indicator 37 is turned on through the logic circuit 36 (step 105).

The rider may see the indication of the indicator 37, and when the rider is in a condition that the rider can answer to the call, for example, when the rider is driving along a road with no obstacles, the rider may push the keypad 26 of the hand unit 45 (step 107) to start the communication (step 109). When the keypad 26 is not operated within a predetermined time period (for example, 15 seconds) after start of the indication of the indicator 37, the BT module 11 transmits a talk-disabled notice to the mobile phone 41. In response, the mobile phone 41 transmits to the caller a message of "There is no response. Record your message after a beep" (step 108).

As for the receiving operation in step 107, in another embodiment, the BT communication device 10A may enter into a voice recognition mode when a predetermined key of the keypad 26 is depressed. The rider can control the BT communication device 10A by voice. This embodiment will be described later with reference to FIG. 5.

When a telephone communication is started, an automatic volume control program is activated (step 111) so as to measure a noise level using a conventional noise level measuring equipment (step 113). When the noise level exceeds a predetermined value, for example, −10 db, the volume may be incremented by 10 db (step 117). When the noise level is equal to or less than −10 db, the current volume may be maintained unchanged (step 116). The automatic volume control is carried out repeatedly, for example, every 2 seconds during the talk (step 119). The automatic volume control technology is described, for example, in the Japanese Patent Application Unexamined Publication (Kokai) No. Showa59-230313.

When the rider depresses the keypad of the hand unit 45 at the end of the talk, the BT communication device 10A transmits a talk completion signal to the mobile phone 41. In response to the completion signal, the mobile phone 41 disconnects the communication (step 123).

Figure 5:
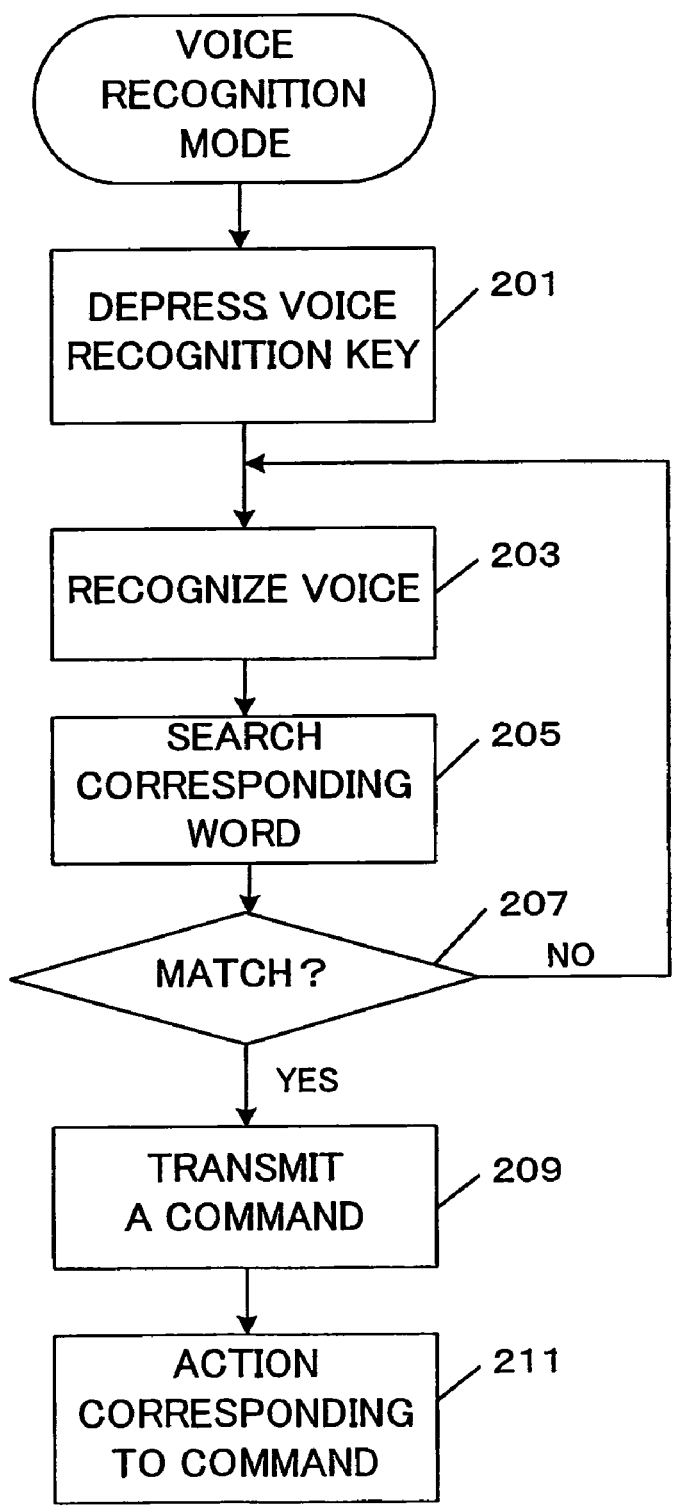
FIG. 5 is a flowchart showing a process of a voice recognition mode according to one embodiment of the present invention.

FIG. 5 shows a flowchart of one embodiment in which a voice recognition mode is started as a predetermined keypad of the hand unit 45 is operated in step 107 for receiving the signal in FIG. 4. When a voice recognition key is depressed (step 201), a voice recognition program of the DSP voice recognition/synthesis device 13 is activated (step 203). Voice input by the rider to the microphone 51 is recognized and words registered in the storage device of voice recognition device are searched (step 205). When the corresponding word is detected (step 207), a command corresponding to that word is sent to the CPU 21 (step 209), and a process corresponding to the command is performed (step 211).

Figure 6:
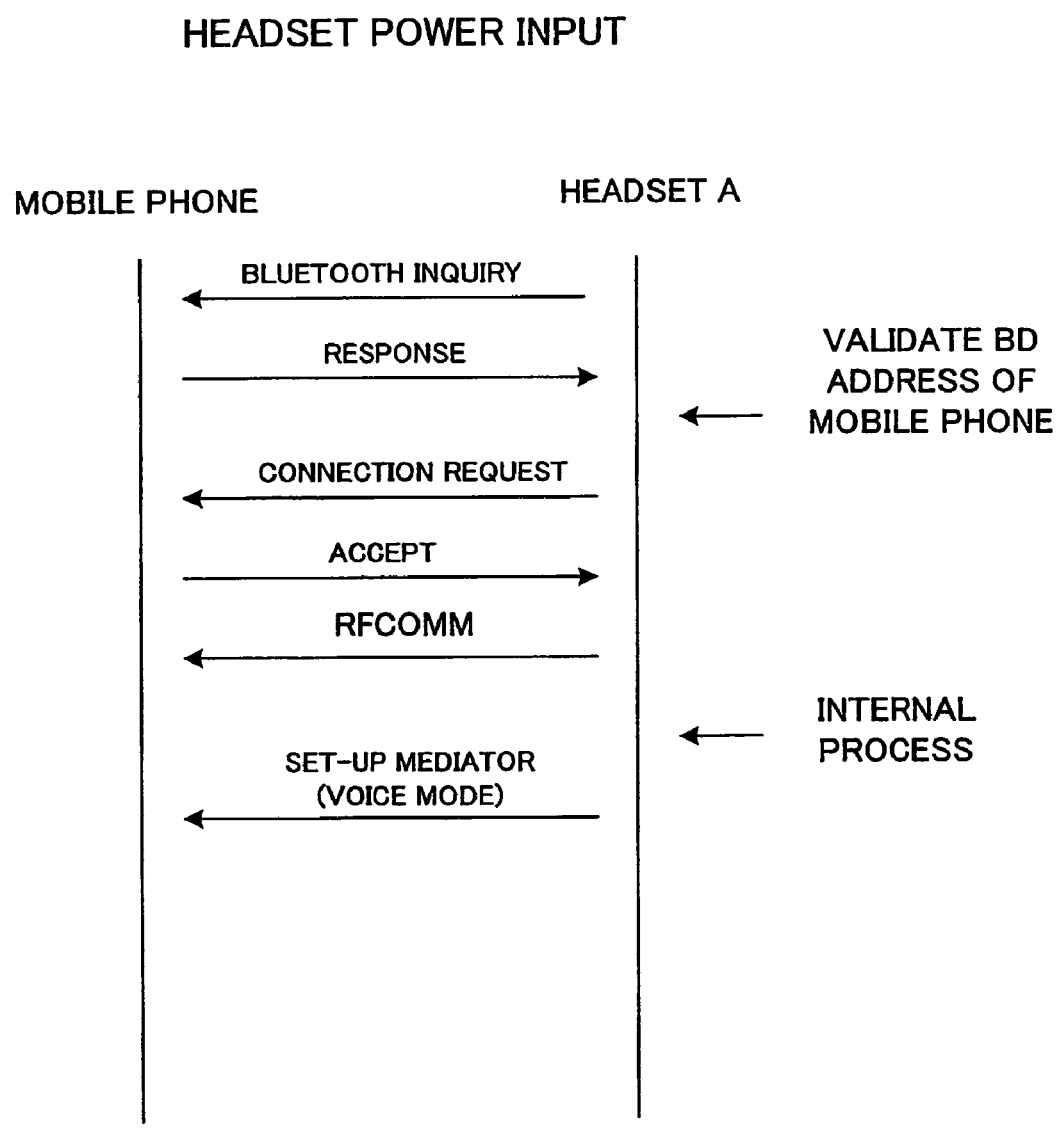
FIG. 6 shows a communication sequence when the power supply of the headset is input according to one embodiment of the present invention.

Referring now to FIG. 6 through FIG. 13, communication modes will be described. FIG. 6 shows a communication with the mobile phone 41 when the power supply of the BT communication device 10A is input. The communication device 10A works as a master, so as to make an inquiry whether any slave exists around. The master broadcasts IQ packets continuously in a predetermined time period. When a slave receives an IQ packet, it transmits a FHS packet informing the master of its attribute. The FHS packet contains a Bluetooth address (BD address) which is assigned uniquely to each Bluetooth terminal. The communication device 10A, which is the master, verifies the received BD address with the mobile phone BD address registered in the communication device 10A so as to recognize that the slave is the mobile phone 41.

The headset A, that is, the communication device 10A, transmits a connection request to the recognized mobile phone 41 and enters into a state of connection by RFCOMM as soon as the mobile phone 41 sends an acknowledgement. RFCOMM is a transport protocol and includes the 9-pin serial port emulation, which is prescribed in the RS-232 standard. In response to the signal from the headset A, the mobile phone 41 sets up a mediator and then terminates the operation associated with the power supply input. The mediator is a Bluetooth adapter installed in the mobile phone 41 and enables the communication in accordance with the Bluetooth standard.

Figure 7:
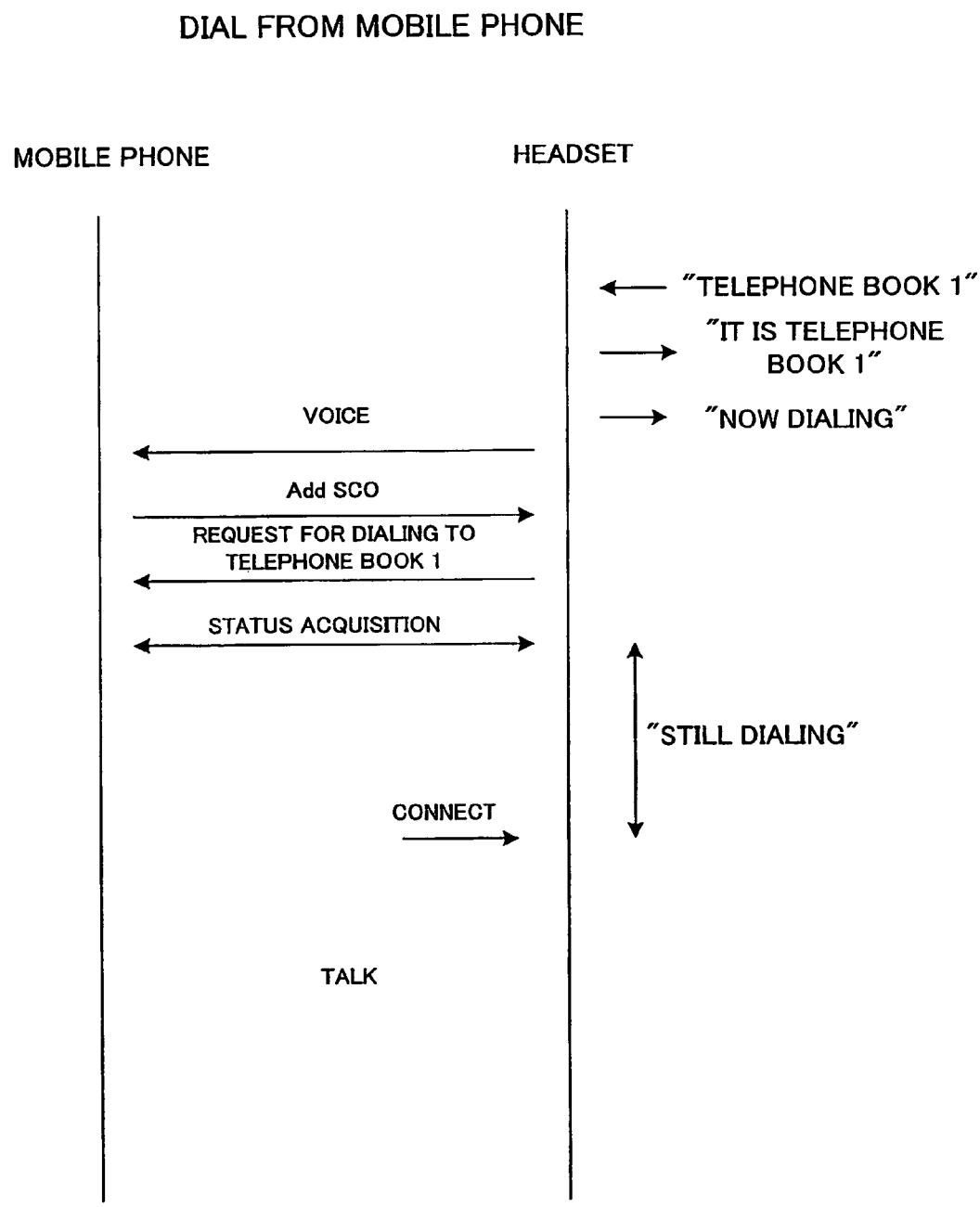
FIG. 7 shows a communication sequence when a mobile phone makes a call according to one embodiment of the present invention.

FIG. 7 shows a process of making a call from the headset A using the mobile phone 41. The headset is already in a voice recognition mode, and the rider can control the communication device 10A by voice. When the rider inputs to the microphone 51 a voice of "the telephone book 1" as a destination to call, voice recognition program of the communication device 10A recognizes the input voice and sends a voice of "the telephone book 1" to the speaker 33 of the headset A for confirmation. Subsequently, the communication device 10A sends a message of "now dialing" to the rider and sends a connection request to the mobile phone 41 for enabling voice communication. This request is executed by means of transmitting an AT command. The mobile phone 41 enters into a communication mode in accordance with the synchronous communication (SCO). In response, the headset A sends to the mobile phone 41 a command for dialing the telephone number of the telephone book 1. In response, the mobile phone 41 dials the number of the telephone book 1 and it connects to the headset A as soon as it gets an answer from the other end of the line. Until this connection is established, a message of "now dialing" is continuously given to the rider. The term "status acquisition" shown in FIG. 7 and other subsequent drawings represents a process for informing the data indicating the current state of the telephone, that is, whether the telephone is in a waiting state or in a talking state. Upon receipt of such information, the headset A can take an appropriate action corresponding to the state of the telephone.

Figure 8:
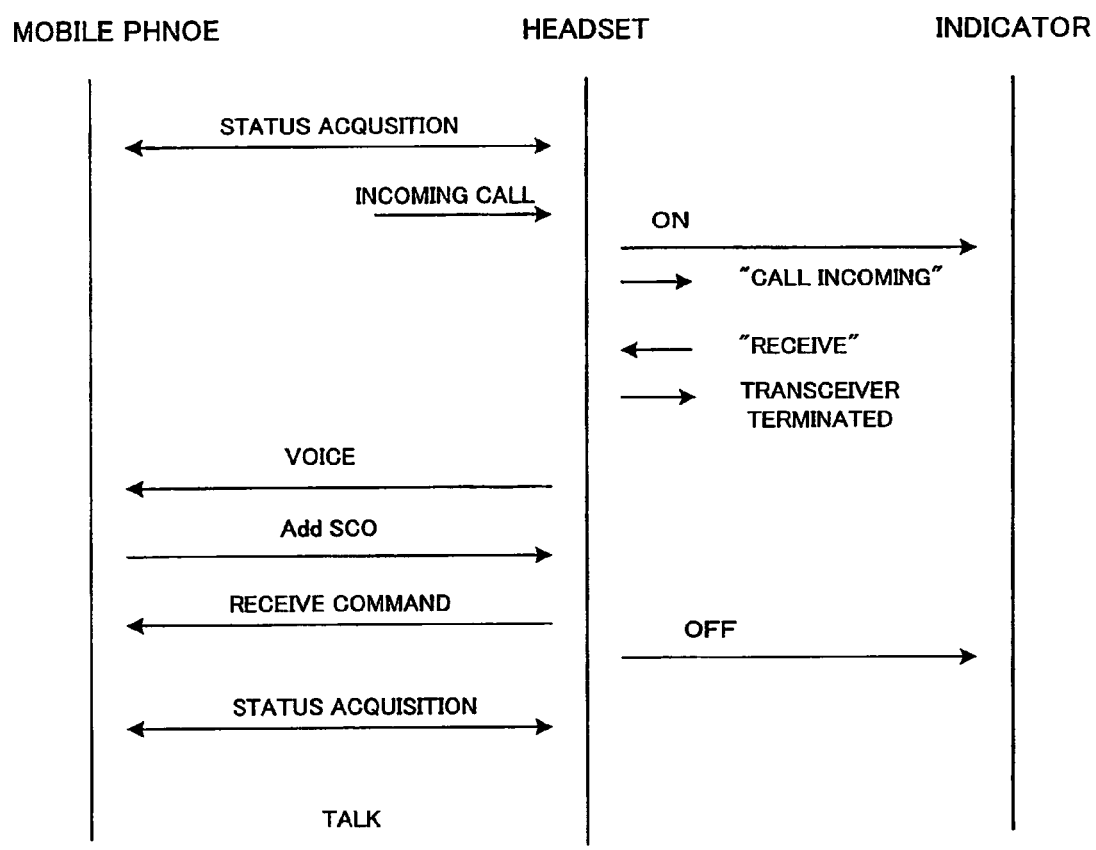
FIG. 8 shows a communication sequence when a mobile phone receives an incoming call according to one embodiment of the present invention.

FIG. 8 shows a process flow of the mobile phone 41 when it receives an incoming call. Under the condition of no communication after the Piconet has been established, a Bluetooth terminal is assumed to be placed in any one of three power-saving modes of park, hold and sniff mode under the control by the master. For example, when the salve is in the park mode, the master can cancel the park mode of the slave if the communication is needed. If the communication is needed on the slave side, the slave informs the master of its intention for transiting the state so as to ask the master to cancel the slave's park mode.

In FIG. 8, when an incoming call is received in the mobile phone 41, the mobile phone 41 informs the headset A of its state in order to request cancellation of the park mode and then transmits the incoming call to the headset A, namely the communication device 10A. The communication device 10A sends a wireless signal to the indicator unit 34 to turn on the indicator disposed in the vicinity of the meter panel of the motorcycle. In parallel, the communication device 10A may send a message of "A call is now incoming" to the miniature speaker 33 within the helmet. In order to receive the call, the rider may operate the keypad 45 of the hand unit 45 or may input a voice of "receive the call" to the microphone when the mobile phone is in voice recognition mode. At this time, if the headset A is making a transceiver communication with the headset B of the tandem rider, that transceiver communication is stopped. A transceiver communication is possible with another rider of another motorcycle or another driver of an automobile traveling around. In such case, the transceiver communication is stopped in the same manner.

The headset A requests for a voice transmission mode to the mobile phone 41. In response, the mobile phone 41 initiates a communication in a synchronous transmission (SCO) mode. The headset A sends a receive command to the mobile phone 41 to receive the call so that the communication is started. The indicator is turned off as soon as the receive command is sent out.

Figure 9:
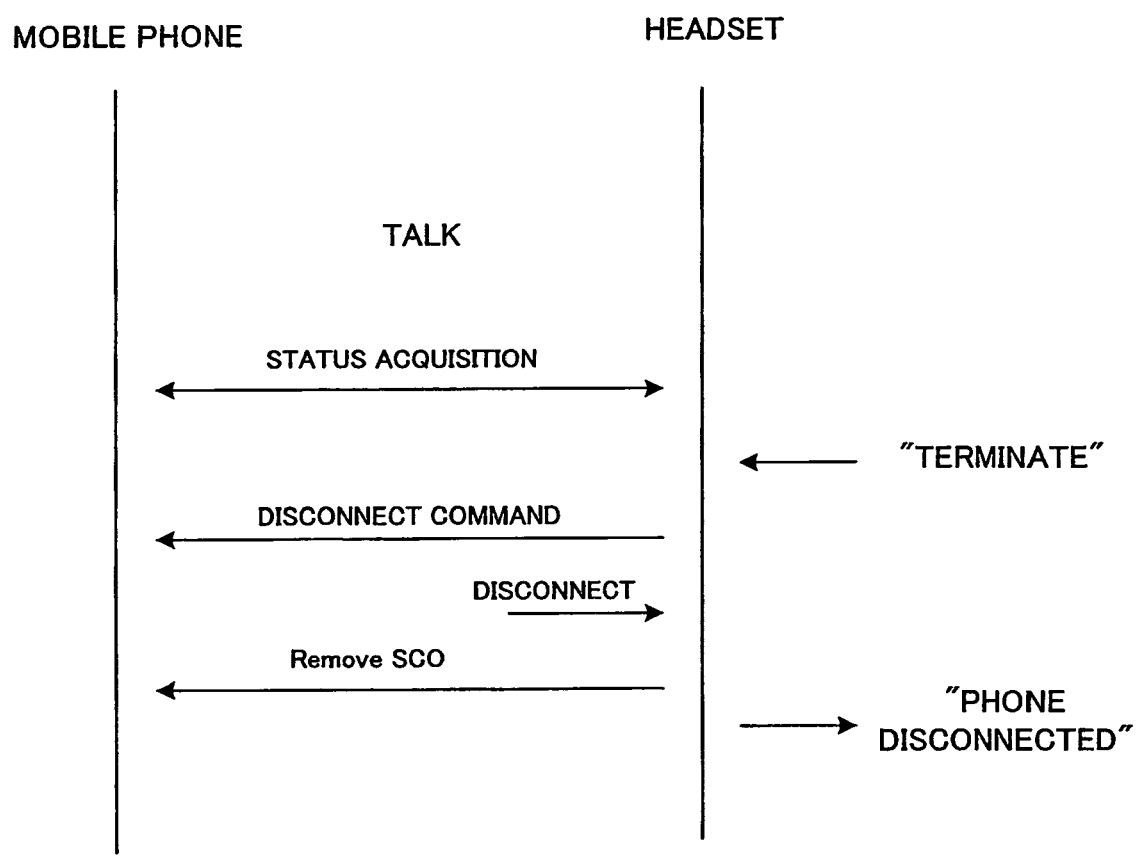
FIG. 9 shows a communication sequence when a rider disconnects a mobile phone talk according to one embodiment of the present invention.

FIG. 9 shows a communication sequence when a rider disconnects a mobile phone talk. When the rider operates the keypad 26 of the hand unit 46 to terminate the talk or the rider inputs a voice of "Terminate the talk" to the microphone 51 when the communication device 10A is in voice recognition mode, the headset A sends a disconnect command to the mobile phone 41. In response, the mobile phone 41 disconnects the telephone communication and then informs the headset A that the disconnection has been completed. In response, the headset A cancels the SCO mode. At the same time, a message of "The telephone call disconnected" is sent to the rider through the speaker 33.

Figure 10:
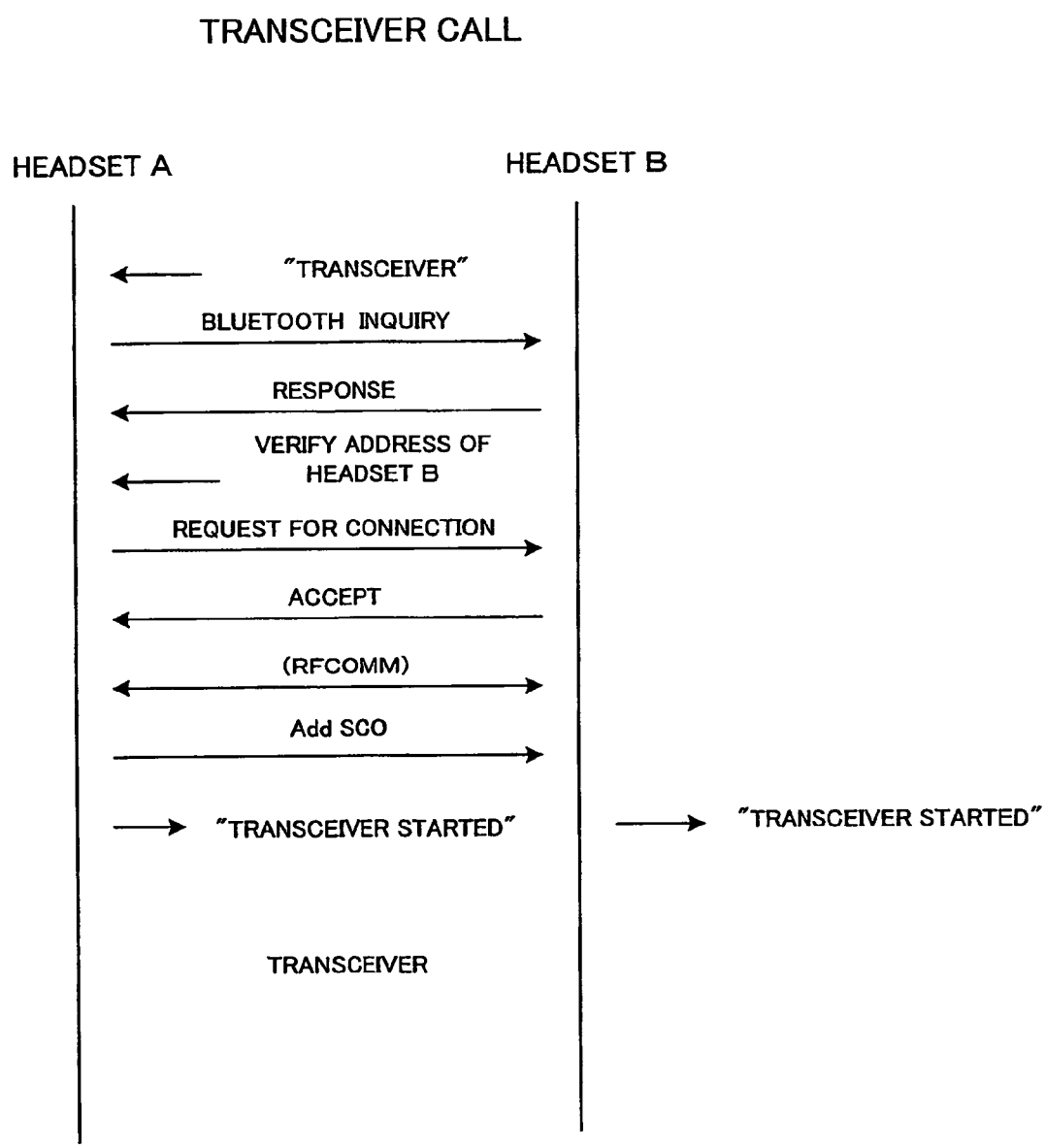
FIG. 10 shows a communication sequence for a transceiver call between headsets according to one embodiment of the present invention.

FIG. 10 shows a communication sequence of a transceiver call. The rider using the headset A may request a "transceiver" mode by means of operating the keypad of the hand unit 45. Alternatively, the rider may request a "transceiver" mode by means of inputting a voice of "Transceiver" to the microphone 51 when the headset A is in voice recognition mode. The headset A starts to work as a master in a Bluetooth inquiry state so as to wait for a response from Bluetooth terminals existing in its vicinity.

When the tandem rider traveling together with the rider of the headset A uses a Bluetooth headset B, this headset B may respond to the inquiry. The headset B may be used by another rider of another motorcycle traveling around or it may be a Bluetooth terminal used by a driver of an automobile. When any one of those terminals responds to the inquiry, a Piconet is established and a transceiver communication between the multiple Bluetooth terminals can be carried out.

When the headset B responds to the inquiry and transmits a FHS packet, the headset A verifies whether or not the Bluetooth address (BD address) specific to the headset B, which is contained in the FHS packet, is registered in the communication device 10A of the headset A. The headset A transmits a connect signal to the verified headset B. In response, the headset B transmits an accept signal, so that the two headsets can enter into the previous described RFCOMM to start the synchronous communication (SCO). Thus, two headsets A and B can start the transceiver communication.

Figure 11:
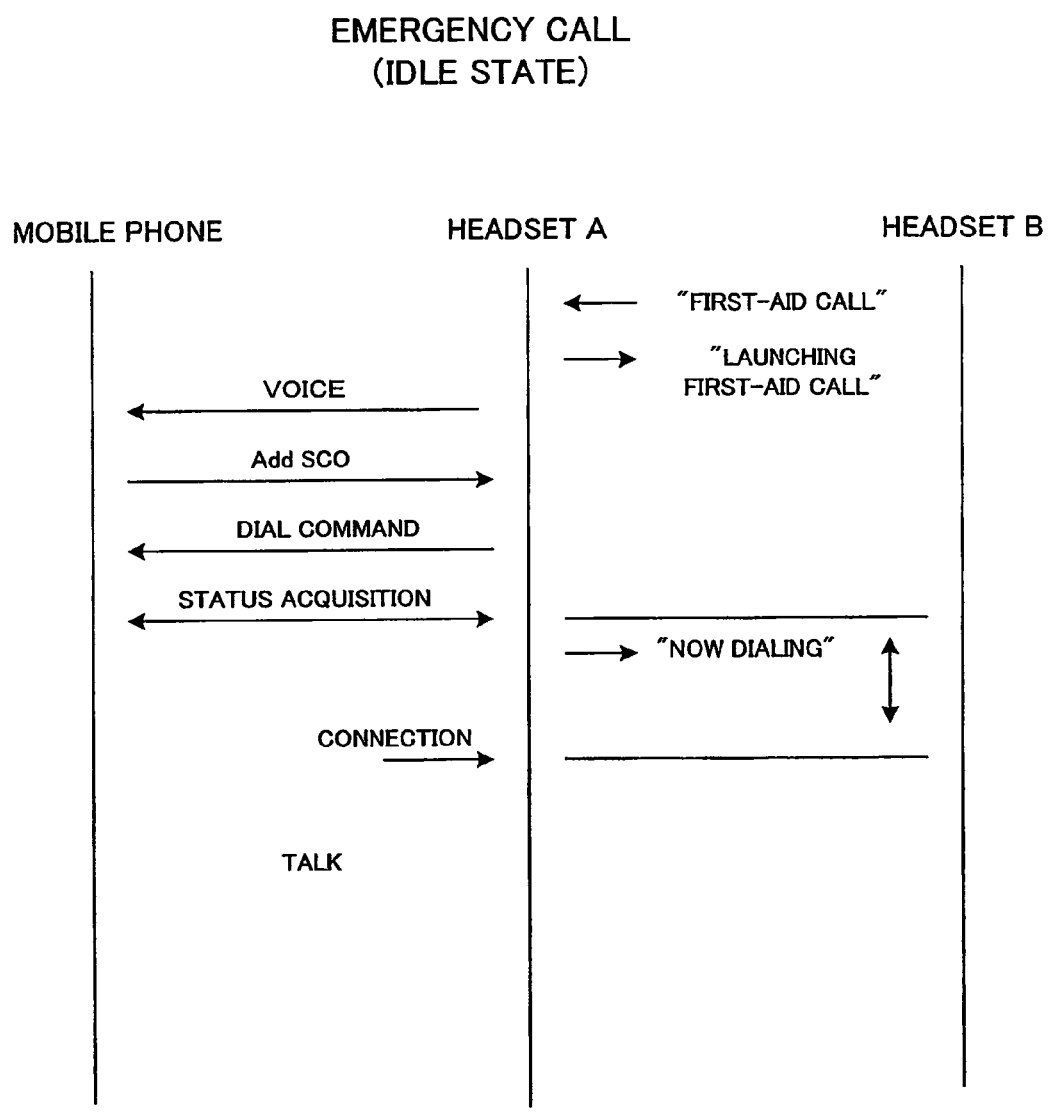
FIG. 11 shows a communication sequence for an emergency call according to one embodiment of the present invention.

FIG. 11 shows a communication sequence for launching a first-aid call as an example of emergency calls. Emergency calls include a first-aid call as well as other emergency calls for the police or other services. When the rider of the headset A operates the keypad 26 of the hand unit 45 so as to request for launching a first-aid call, the headset A requests the mobile phone 41 to make a connection in voice transmitting mode, and in response the mobile phone 41 starts a synchronous communication (SCO). The headset A requests the mobile phone 41 to connect with a first-aid center. In response, the mobile phone 41 calls the first-aid center registered in the mobile phone 41. Thus, the rider using the head set A can make a telephone talk with the first-aid center.

Figure 12:
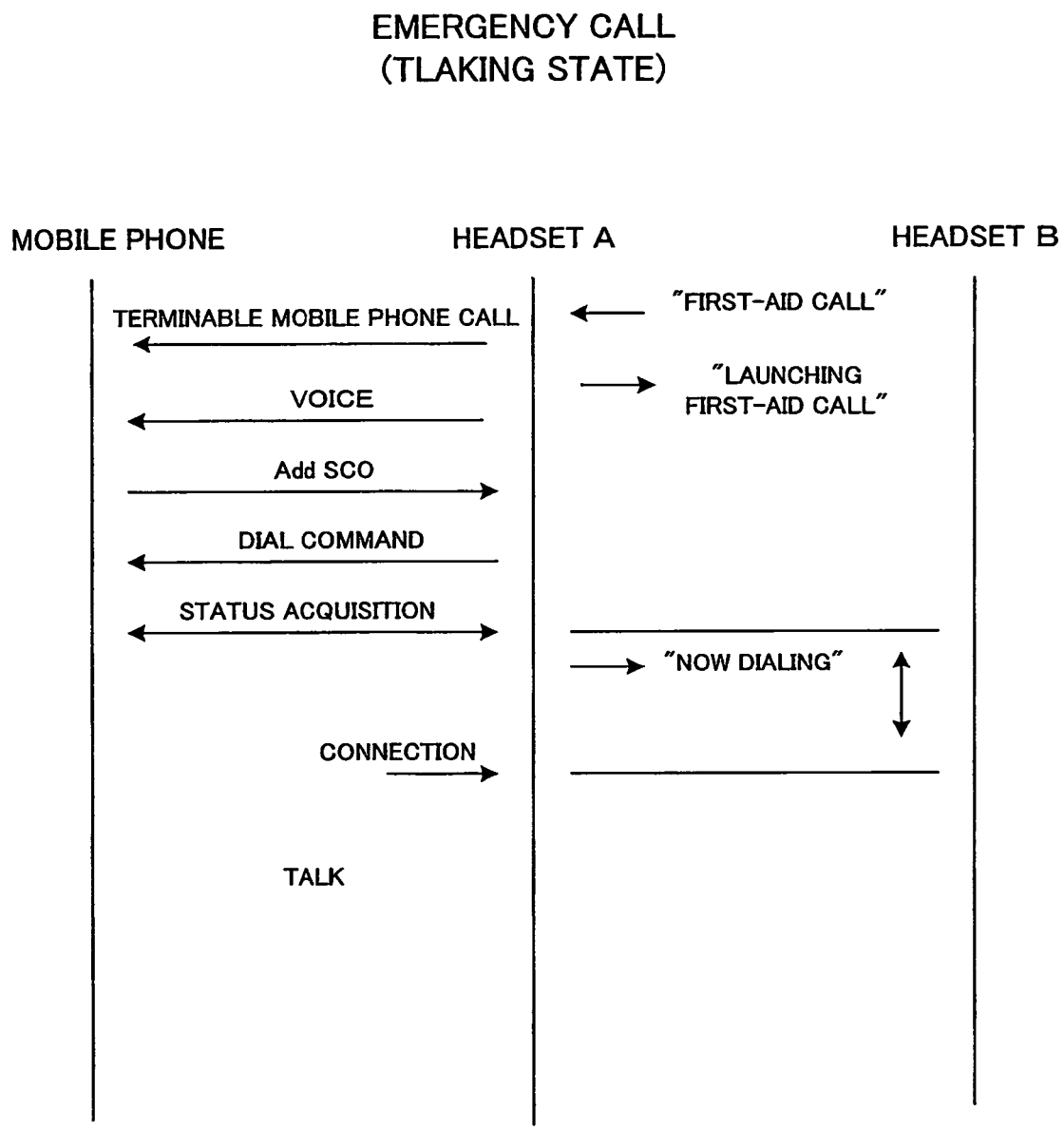
FIG. 12 shows a communication sequence for an emergency call from a mobile phone in a talking state according to one embodiment of the present invention.

FIG. 12 shows a communication sequence for launching a first-aid call when a telephone talk is in progress through the mobile phone 41. When the rider who is talking over the mobile phone 41 operates the hand unit 45 to launch a first-aid call, the communication device 10A requests the mobile phone 41 to terminate the current communication of the mobile phone. When the headset A is in voice recognition mode, the rider may use voice, instead of the operation on the hand unit 45, to request for the first-aid call. The communication sequence after disconnection of the telephone call of the mobile phone 41 is the same as above described with reference to FIG. 11.

Figure 13:
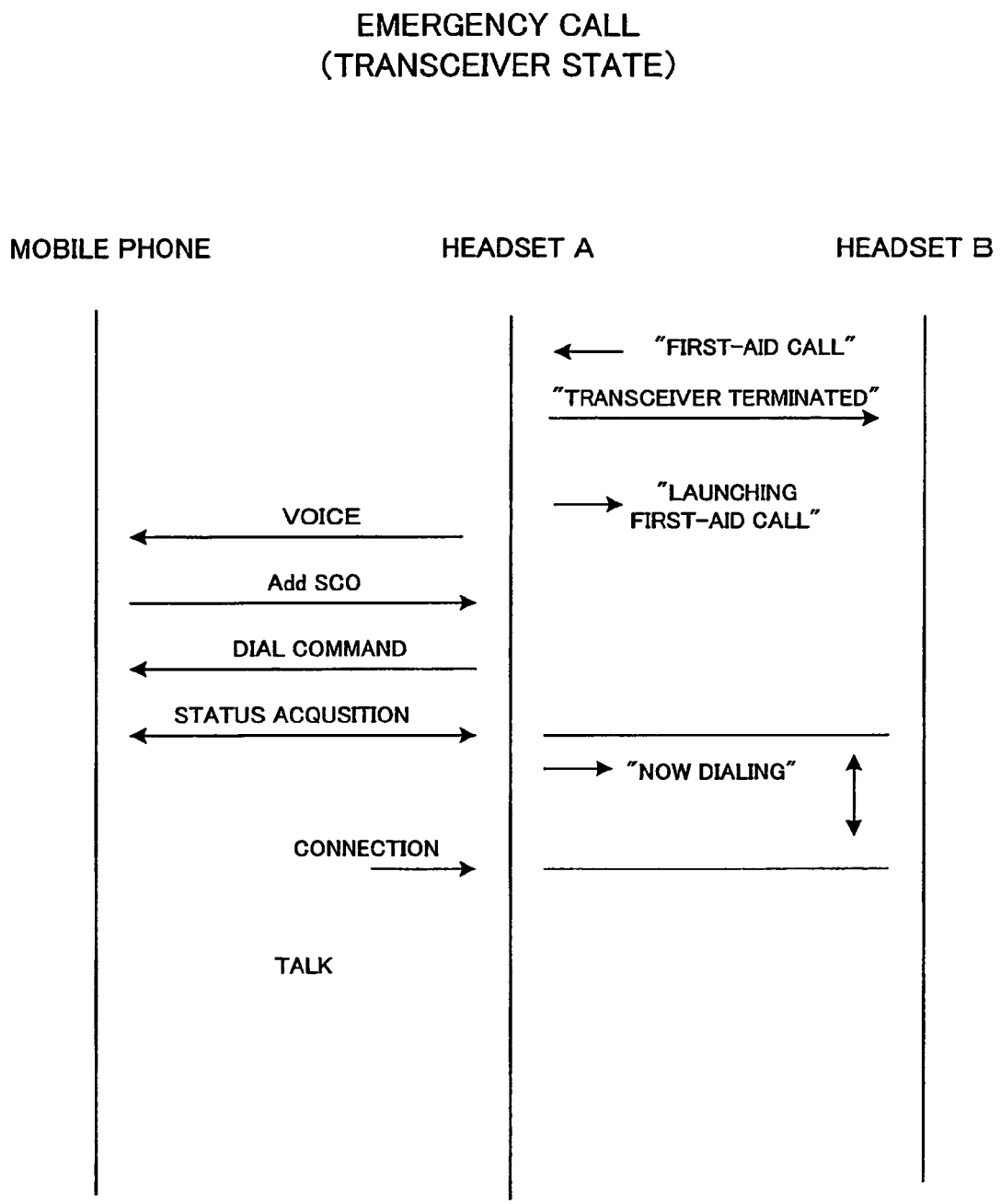
FIG. 13 shows a communication sequence for an emergency call from a mobile phone in a transceiver state according to one embodiment of the present invention.
Figure 14:
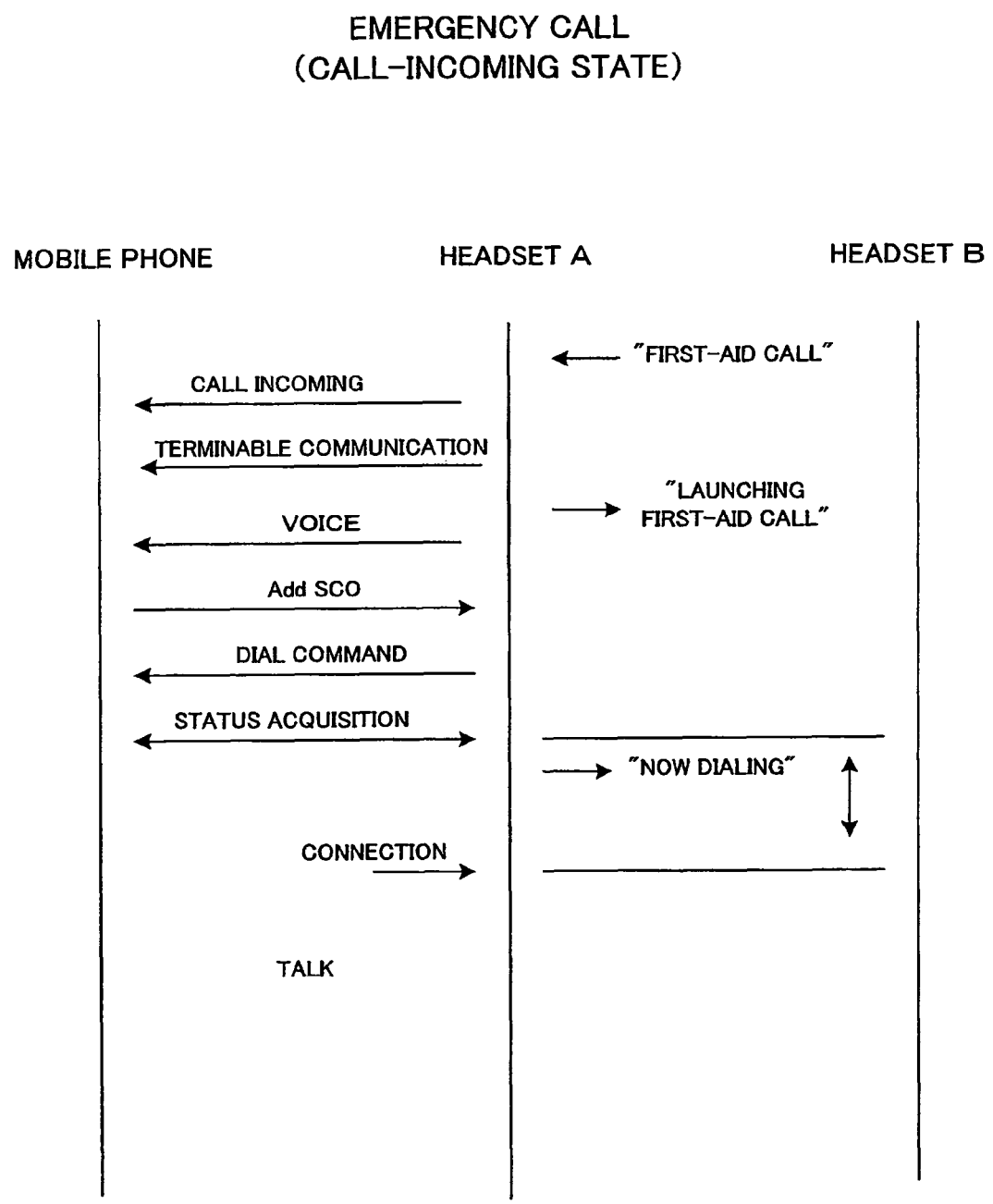
FIG. 14 shows a communication sequence for an emergency call from a mobile phone in a call-incoming state according to one embodiment of the present invention.

FIG. 13 shows a communication sequence for the rider using the headset A to launch a first-aid call when the headset A is in a state of transceiver communication with another headset B. When the rider using the headset A makes the same operation for the first-aid call as in the case shown in FIG. 12, the headset A transmits a complete-transceiver signal to the headset B. The communication sequence after disconnection of the transceiver talk is the same as above described with reference to FIG. 11.

Although the present invention has been described with reference to some specific embodiments, the invention is not limited to those embodiments.

The invention claimed is:

1. A Bluetooth communication system, comprising:
    a Bluetooth communication device mountable to a helmet;
    an indicator unit having a visual indicator, within a meter panel or a console part of a vehicle, disposed in a viewing range of a driver of the vehicle;
    an FM transmitting module which is disposed in the Bluetooth communication device for transmitting an indication signal to the indicator in response to reception of an incoming call signal in a mobile phone; and
    an FM receiving module which is disposed in the indicator unit for driving the visual indicator in response to reception of the indication signal,
    wherein the Bluetooth communication device comprises a Bluetooth transceiving module communicating with the mobile phone.

2. The Bluetooth communication system according to claim 1 wherein the Bluetooth communication device is connected to a microphone and a speaker, the device comprising a voice recognition unit for performing voice recognition upon voice input to the microphone and a control unit for transforming the recognized voice into control signals.

3. The Bluetooth communication system according to claim 2 wherein the microphone comprises a bone conductive microphone or a noise cancellation microphone.

4. The Bluetooth communication system according to claim 2 wherein the Bluetooth communication device comprises a noise level detection circuit and a circuit for adjusting an audio volume based on the noise level detected by the noise level detection circuit.

5. The Bluetooth communication system according to claim 2 wherein the Bluetooth communication device comprises a voice synthesis unit for transforming the signal from the Bluetooth module into voice.

6. The Bluetooth communication system according to claim 1 wherein the Bluetooth communication device comprises a manual switch for enabling a communication when the manual switch is operated.

7. The Bluetooth communication system according to claim 2 wherein the Bluetooth communication device comprises a manual switch for activating voice recognition unit when the manual switch is operated.

8. The Bluetooth communication system according to claim 2 wherein the control unit is configured so as to send a first-aid call transmission command to the mobile phone in response to a predetermined voice input from the driver.

9. The Bluetooth communication system according to claim 1 wherein the Bluetooth communication device comprises a Bluetooth module that can form a network with another Bluetooth device in accordance with the Bluetooth standard.

10. A communication system, comprising:
a communication device movable with a user;
an indicator unit having a visual indicator, within a meter panel or a console part of a vehicle, disposed in a viewing range of the user;
an FM transmitting module which is disposed in the communication device for transmitting an indication signal to the indicator in response to reception of an incoming call signal in a mobile phone; and
an FM receiving module which is disposed in the indicator unit for driving the visual indicator in response to reception of the indication signal,
wherein the communication device comprises a Bluetooth transceiving module communicating with the mobile phone.

* * * * *